July 4, 1939. W. L. MORRISON 2,164,342
WINDOW CONSTRUCTION FOR AUTOMOBILES
Filed June 30, 1933 2 Sheets-Sheet 1
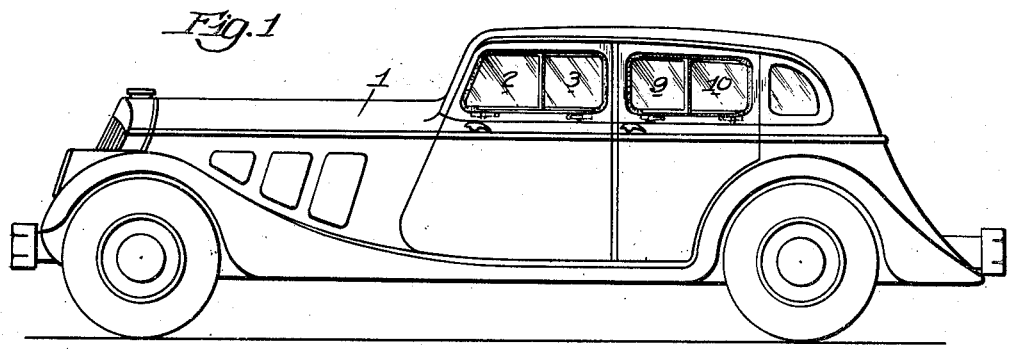
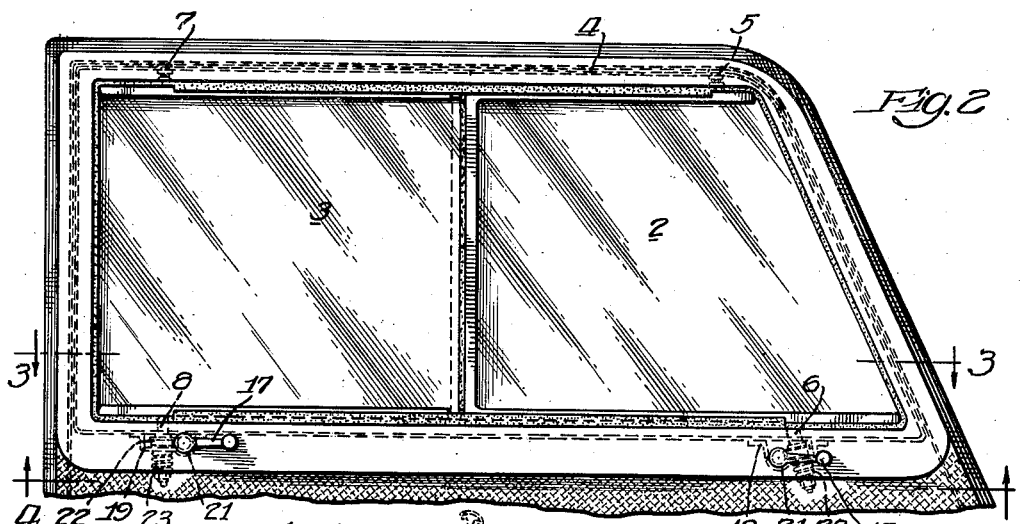
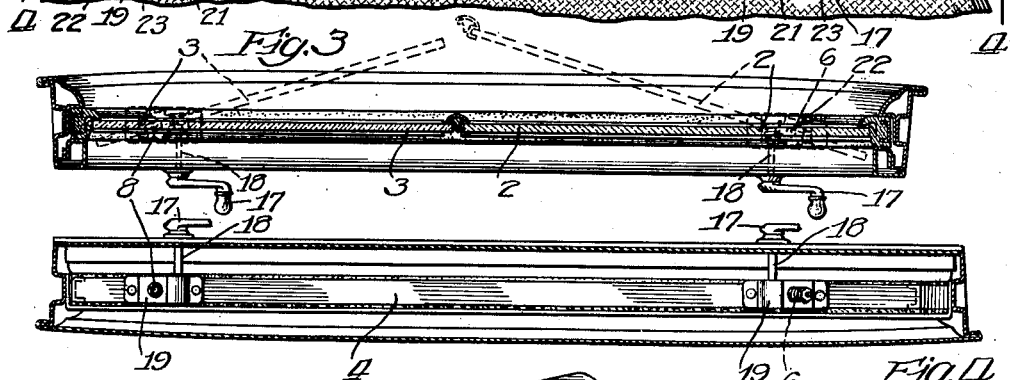
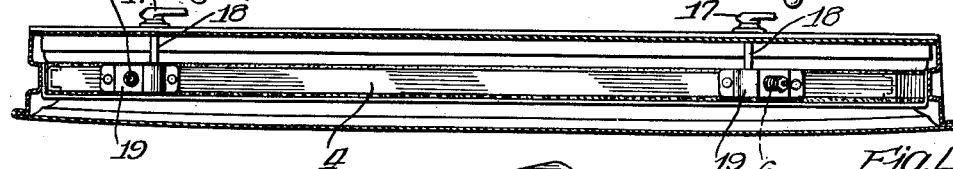
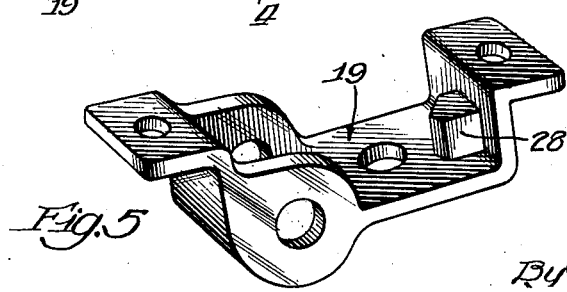
Inventor:
Willard L. Morrison
By Parker & Carter attys.

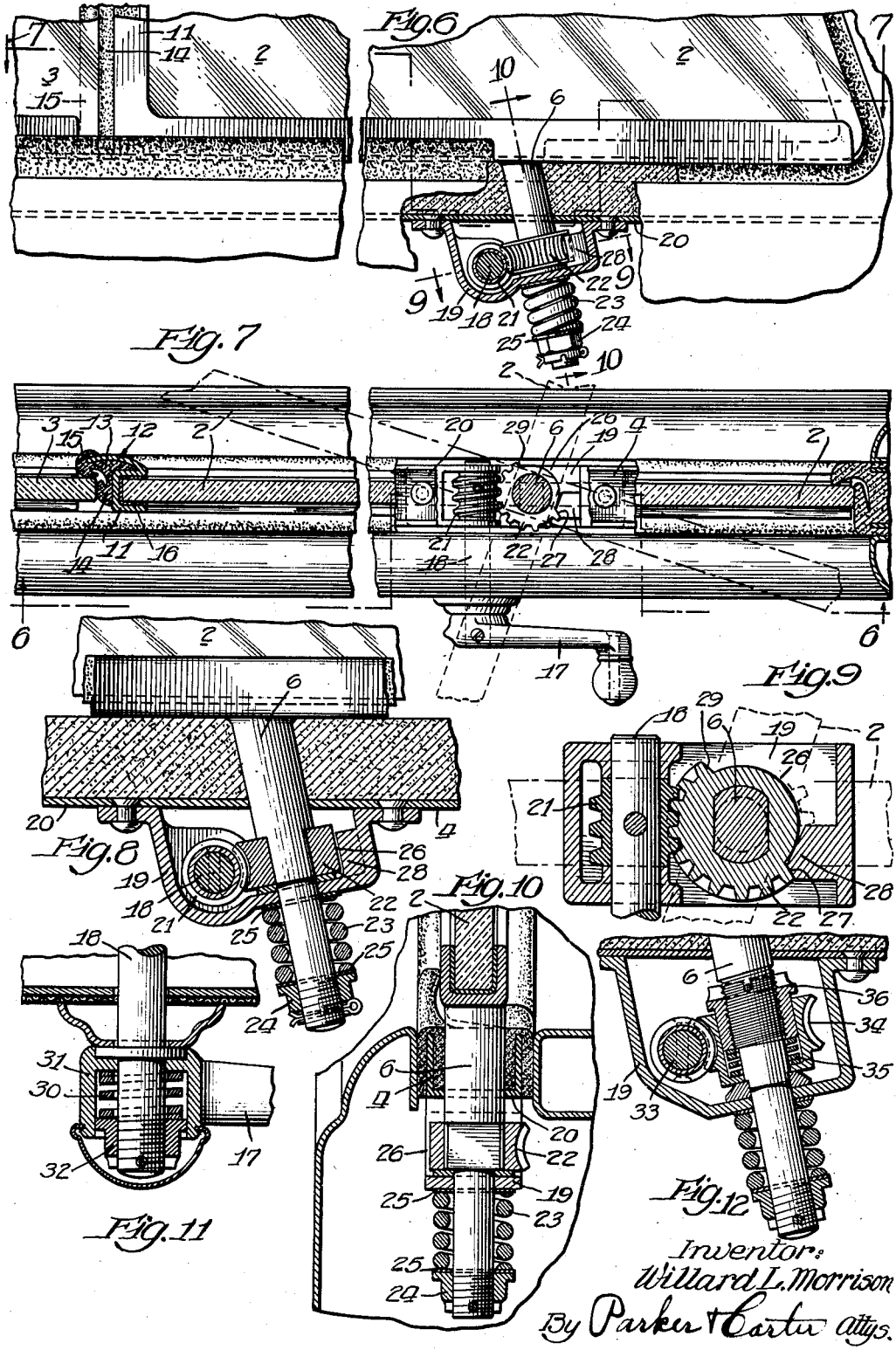

Patented July 4, 1939

2,164,342

UNITED STATES PATENT OFFICE 2,164,342

WINDOW CONSTRUCTION FOR AUTOMOBILES

Willard L. Morrison, Chicago, Ill.

Application June 30, 1933, Serial No. 678,400

6 Claims. (Cl. 296—44)

This invention relates to window constructions for automobiles and has for its object to provide a new and improved device of this description. The invention has as a further object to provide a pivoted window section with an operating mechanism for moving it about its pivot, and means for preventing the operating mechanism from being moved to such an extent as to cause injury to the parts. The invention has as a further object to provide an automobile pivoted window section with an operating mechanism for moving it about its pivot, provided with means for rendering the operating mechanism inoperative before danger to the parts can be brought about by operating such operating mechanism. The invention has as a further object to provide a pivoted window section for automobiles with a crank mechanism for moving it about its pivot, and automatic means for preventing a too great movement of the crank mechanism. The invention has other objects which are more particularly pointed out in the accompanying description.

Referring now to the drawings, Fig. 1 is a side elevation of an automobile with a window construction embodying the invention;

Fig. 2 is an enlarged inside view of the window construction shown in Fig. 1;

Fig. 3 is a sectional view taken on line 3—3 of Fig. 2;

Fig. 4 is a sectional view taken on line 4—4 of Fig. 2;

Fig. 5 is a perspective view of the bracket for the crank shaft and pivot;

Fig. 6 is an enlarged view in part section showing the pivot and connecting operating mechanism;

Fig. 7 is a sectional view taken on line 7—7 of Fig. 6, with parts broken away;

Fig. 8 is an enlarged vertical sectional view through the pivot operating mechanism;

Fig. 9 is an enlarged sectional view taken on line 9—9 of Fig. 6;

Fig. 10 is an enlarged sectional view taken on line 10—10 of Fig. 6;

Fig. 11 is a sectional view of the pivot operating mechanism showing a modified construction;

Fig. 12 is a sectional view through the pivot operating mechanism showing a further modification.

Like numerals refer to like parts throughout the several figures.

Referring now to the drawings, I have illustrated an automobile 1 with a window construction embodying the invention. In this device the front door of the automobile is provided with a window construction wherein there are two window sections 2 and 3, the window section 2 being pivotally connected to the frame 4 by the pivots 5 and 6. The section 3 is pivoted to the frame by the pivots 7 and 8. The rear door has similar window sections 9 and 10 pivoted in position by similar pivots. The lower pivots 6 and 8 are preferably friction pivots arranged so that the pivotal movement of the sections are resisted so that the sections may be held in any position into which they are moved. The sections 2 and 3 are arranged so that they may be moved to any angular position for wind deflecting and ventilating purposes, and may be moved to a closed position to close the window. When in a closed position they are in substantial alignment and the space between them is sealed by a suitable sealing device which may be of any desired construction.

I have shown one form of sealing device wherein there is attached to the edge of the section 2 a rigid member 11 with a projecting part 12 which projects toward the section 3, see Fig. 7. Attached to the rigid member 11 is a sealing piece 13 which may be of any suitable material, such as rubber, and which has a flap 14 which engages the edge of the section 3, and a flap 15 which engages the outer face of the section 3, as clearly shown in Fig. 7. The member 11 may be of metal and it has a non-metallic packing 16 between it and the glass 2. It will be seen that when the glass 3 is brought into its closed position it does not strike metal, but strikes a soft packing material.

Both glass sections are illustrated as being moved to angular positions by means of a similar mechanism. This mechanism, as shown in Figures 1 to 9 inclusive, consists of a crank or handle 17 connected with a shaft 18 mounted in a bearing in a bracket 19 attached to a stationary portion 20 surrounding the window opening. The shaft 18 is provided with a gear 21 having teeth which mesh with a gear 22 on the pivot 6. The pivot 6 passes through the bracket 19, and a friction device is associated with it to frictionally resist its rotation so that the glass section will be held in any angular position into which it is moved. In this construction the friction device consists of a spring 23 which surrounds the pivot 6 and which is compressed by means of a nut 24 threaded on to the pivot so as to press the spring tightly against the bracket 19 and produce a frictional contact which holds the glass section in any position into which it is moved. I prefer to provide friction washers 25 between the spring and the bracket 19, and the spring and the nut 24.

Both window sections are moved about their pivotal connections by similar mechanism. When the gears 21 and 22 are made in the form illustrated, that is a worm and a worm gear, they act as a lock to lock the window sections in any angular position into which they are moved, and in that event the friction device may be dispensed with. When such mechanism is used there is always the chance that the mechanism will be moved to move the sections to too great an extent. If, for example, the section 2 is closed and the section 3 is moved too far, the glass may be broken by the pressure brought against the metal piece 13. In other words, the moving the glass sections too far may cause injury to them and to the mechanism. I have arranged a device where this cannot happen.

As shown for example in Figures 1 to 9 the gear 22, see Figs. 7 and 9, has a portion of the teeth at 26 removed. There is a shoulder 27 on the gear which engages a stop 28 on the bracket 20 and limits the movement of the glass section in one direction. There is a shoulder 29 which engages this stop and limits the movement in the other direction. It will be seen that by means of this arrangement the glass sections are stopped so that injury to the parts cannot be brought about by turning the handle 17 to too great an extent.

Instead of having the construction with the stop, I may provide a friction device, as shown for example in Fig. 11. In this construction the handle or crank 17 is not directly connected with the shaft 18, but has a frictional contact therewith. This frictional contact is produced by means of a spring 30. The crank 17 has a hub 31 into which the spring is received and the shaft 18 is threaded and is provided with a nut 32. It will be seen that when the nut is tightened the spring will be compressed against the hub of the crank so as to cause a frictional engagement between the crank and the shaft 18. This frictional engagement may be adjusted so that the crank will move with relation to the shaft after the parts have been moved to a predetermined position to produce a predetermined pressure, and this can be regulated so that this pressure will not be sufficient to do injury, and before this pressure can be exceeded the crank 17 will rotate on the shaft and no harm will be done.

In Figure 12 I have shown a modified friction arrangement. In this construction the worm 33 engages a worm gear 34 and this worm gear, instead of being directly connected with the pivot 6, has a friction clutch engagement, that is the worm gear 34 is hollow and contains a spring 35. There is a nut 36 threaded on the pivot 6, and when this nut is tightened the spring is compressed so as to exert a friction between the gear 34 and the nut or pivot and before pressure, due to the turning of the crank, can reach a dangerous point the gear 34 rotates on the pivot 6 without rotating this pivot.

I claim:

1. A window construction for automobiles comprising a pivoted window section having a pivot intermediate its edges, operating mechanism connected with said pivot for pivotally moving said window section, said operative means acting as a positive lock for said window, and means for rendering said operating mechanism inoperative when the window section has been moved to a predetermined position, said means consisting in transferring the force applied to the operating mechanism from said pivot to a fixed part on the automobile.

2. A window construction for automobiles comprising a window section, a pivot connected therewith intermediate the edges of said window section, a crank, an operative connection between said crank and said pivot by means of which the section is given a pivotal movement by rotating the crank, a friction device for opposing the movement of said crank, and means for rendering said crank inoperative when the window section is moved to a predetermined position, said means consisting in transferring the force applied to the operating mechanism from said pivot to a fixed part on the automobile.

3. A window construction for automobiles comprising a window frame, a window section in said frame, a pivot connected with said window section intermediate its edges and extending downwardly through said frame, a crank below said frame and an operative connection between said crank and said pivot, said connection acting as a lock to prevent the window from being opened by applying pressure directly thereto, and means for rendering said crank inoperative to apply further pressure to said pivot when the window section has been moved to a predetermined position.

4. A window construction for automobiles comprising a window frame, a window section therein, a pivot connected with said window section and projecting through said frame, a bracket below said frame separate therefrom and provided with an opening through which said pivot projects, a crank, a shaft connected therewith projecting into said bracket between the frame and the bracket and, an operative connection between said shaft and said pivot, a friction device connected with said pivot below said bracket for resisting its movement.

5. A window construction for automobiles comprising a window frame, a window section therein, a pivot connected with said window section and projecting through said frame, a bracket below said frame separate therefrom and provided with an opening through which said pivot projects, a crank, a shaft connected therewith projecting into said bracket between the frame and the bracket and, an operative connection between said shaft and said pivot, and means for rendering said crank inoperative when the window section has been moved into a predetermined position, said means consisting in transferring the force applied to the operating mechanism from said pivot to a fixed part on the automobile.

6. A window construction for automobiles comprising a glass section, a pivot connected with said glass section between its ends, operating mechanism connected with said pivot for moving said pivot to move the window, means for limiting the movement of the operating mechanism connected with said pivot so as to prevent strains being transmitted through the glass to cause injury to such glass, which consists in transferring the force applied to the operating mechanism from the pivot to a fixed part on the automobile.

WILLARD L. MORRISON.